June 29, 1965   F. W. PAURAT   3,191,756
BELT-TYPE CONVEYORS
Filed Dec. 26, 1962   2 Sheets-Sheet 1

Friedrich W. Paurat
INVENTOR.

BY Karl G. Ross
AGENT

June 29, 1965   F. W. PAURAT   3,191,756
BELT-TYPE CONVEYORS

Filed Dec. 26, 1962   2 Sheets-Sheet 2

Friedrich W. Paurat
INVENTOR.

BY   Karl G. Ross
AGENT.

_United States Patent Office_

3,191,756
Patented June 29, 1965

3,191,756
BELT-TYPE CONVEYORS
Friedrich Wilhelm Paurat, Alte Hunxer Str. 45,
Friedrichsfeld, Lower Rhine, Germany
Filed Dec. 26, 1962, Ser. No. 246,952
Claims priority, application Germany, Dec. 29, 1961,
P 28,510
5 Claims. (Cl. 198—128)

The present invention relates to a band-type conveyor and, more particularly, to improvements in materials-handling conveyors operating on the centrifuge principle.

Band-type centrifuges comprising an endless conveyor band capable of casting off a loose material deposited thereon have been proposed heretofore. Such devices, also termed "projection" machines, were generally provided with at least two band-support rollers disposed on opposite sides of a supply or feed means (e.g. a hopper for bulk material) and were driven by the rearwardly disposed roller. One of the characteristics of these prior-art devices was that the particulate material did not always travel at the speed of the band, particularly at higher operating velocities so that slippage and relative motion occurred. The resulting decrease in efficiency rendered such conveyor systems unsuitable for use in mine-gobbing operations and other common modes of utilization of such conveyor devices in the handling of mined material below grade, in shafts or the like. This is particularly the case in situations wherein a flywheel is provided for deflecting the band over an arcuate path to change the direction of material flow. The slippage thus occurs primarily at this arcuate portion of the band although considerable additional relative motion occurs just prior to the deflection of the band away from the path of material at the casting or slinging end of the devices at which true centrifugal displacement of the material is observed.

There exists for each band a characteristic limiting velocity beyond which slippage occurs and up to which the particulate material travels at substantially the same speed as the band. This well-defined limiting speed cannot, in general, be approached at the practical level since changes in load and power fluctuations would tend to result in the surpassing of the limiting velocity and a consequent reduction in the efficiency. This reduction in efficiency is accompanied by a relative motion between the particulate material and the band which is disadvantageous in that it causes deterioration of the latter. When efficiency is referred to herein, it should be understood that it can be measured in terms of the quotient of material velocity and band speed.

It is an object of the present invention to provide an improved band-type centrifuge capable of operating at a working speed above the normal limiting velocity of earlier devices of this type.

It is a more specific object of the invention to provide a band conveyor suitable for gobbing and other mine operations which is capable of handling particulate material at a relatively high rate with substantially increased efficiency.

According to a feature of the invention, the band is provided with means for transversely vibrating at least the discharge end thereof, i.e. an upwardly and forwardly inclined front portion of its upper reach, in a vertical plane concurrently with the displacement of the particulate material. While there has been no hint in the prior art that such vibrations can affect the efficiency of a conveyor band, it has been found that they supplement the centrifugal force present at the forward terminal roller and reduce slippage between the material and the band.

The oscillations of the band can be effected in many ways. For example, that forward terminal roller may be eccentric or of prismatic configuration to vibrate the discharge end of the band at least once during the interval required for transit along the inclined front portion thereof. It is desirable to provide means for elastically supporting at least this end of the band so that the latter can be composed of a resilient material (e.g. rubber) while the forward terminal roller is elastically suspended and capable of movement in the direction of travel. Should it be desirable to make the band of an inelastic material or to supplement the swinging capabilities of the band, the entire band-guiding system consisting of support rollers and deflecting rollers may be shiftably mounted and/or provided with restoring means capable of counteracting the effect of the oscillation-generating means. The latter may also include any of the usual mechanical oscillators such as magnetostrictive devices, cams, eccentrics, lever linkages, and conventional electro-mechanical means. Since relative motion is reduced by such oscillations, the band can operate at a considerably higher speed than has been possible heretofore.

The above and other objects, features and advantages of the present invention will become more readily apparent from the following description, reference being made to the appended drawing in which.

Figure 1:
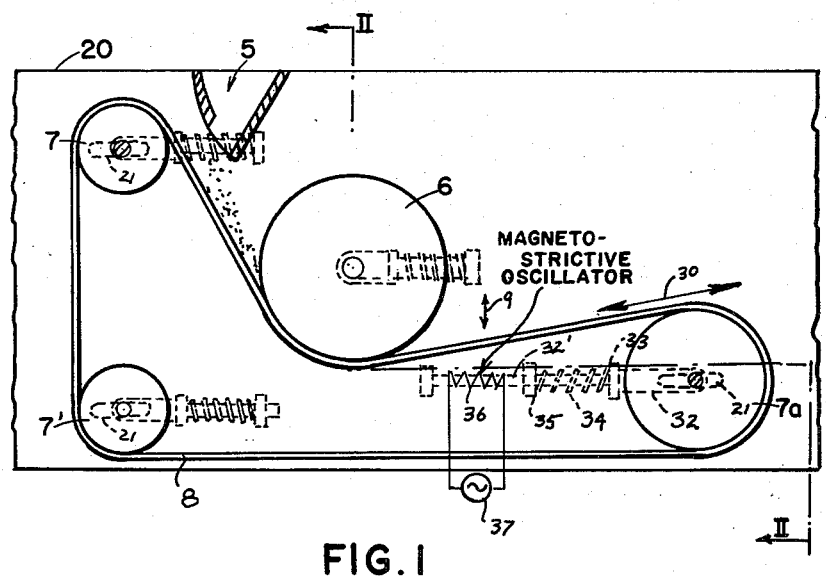
FIG. 1 is a side-elevational view, partly broken away, diagrammatically showing a conveyor band according to the invention.
Figure 2:
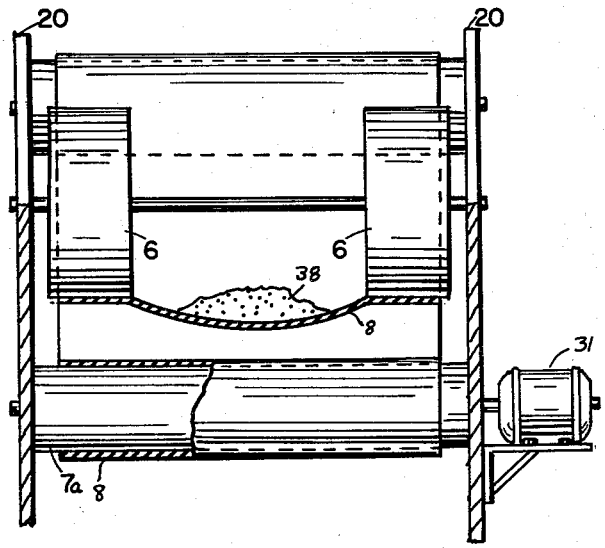
FIG. 2 is a cross-sectional view taken along the line II—II of FIG. 1.
Figure 3:
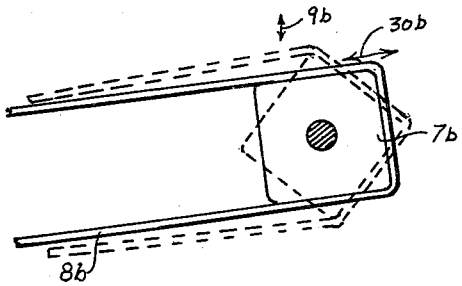
FIG. 3 is a view similar to FIG. 1, illustrating a portion of a modified embodiment.

In FIGS. 1 and 2 of the drawing I show an arrangement wherein a band 8 passes around spring-loaded movable rollers 7 and 7' rearwardly of a supply hopper 5, which deposits the loose material upon the upper reach of the band for entrainment in the direction of band travel 30. A driven roller 7a at the discharge end (terminus of the upper reach) of the band is rotated by a motor 31 and is also resiliently mounted for oscillation generally in the direction of arrow 30. Each of the elastic mountings may consist of a pair of rods 32 journaled on the roller axle, which pass through slots 21 in a pair of lateral plates 20. These rods carry shoulders 33 against which coil springs 34 are seated and pass through blocks 35 rigid with the plates 20. The rod 32 of roller 7a is provided with an extensoin 32' of magnetic material surrounded by a coil 36 in circuit with an electric source 37 so that, upon energization of the coil 36, the extension 32' elongates momentarily magnetostrictively to urge roller 7a generally in the direction of arrow 30. A pair of axially spaced flywheels designed as deflecting rollers 6 are disposed intermediate hopper 5 and the drive roller 7a so that the resilient flexible band 8 passes around the periphery of these rollers. The material 38 deposited upon the band 8 thus deflects the latter so that, at least between rollers 6, it is substantially trough-shaped (FIG. 3). At least part of the material is, therefore, at a distance from the axis of rollers 6 greater than the diameter of the latter so that considerable centrifugal force is exerted upon this material. This centrifugal force acts to hold the material against the band and, consequently, to reduce relative motion therebetween. It should be noted that the rollers 6, 7 and 7' may also be provided with elastic suspensions of the type described with reference to rollers 7a but that these additional suspension means may be dispensed with when the band is elastic as shown in FIG. 2. It is also possible to apply substantially vertical oscillations to the band (arrow 9) along its discharge portion intermediate rollers 6 and 7a. Since this discharge portion of the band is inclined upwardly, such vertical oscillations will also have a component acting in the direction of arrow 30, i.e. in the direction of the band; conversely, any longitudinal oscillation (arrow 30) imparted to conveyor band 8 will result in a certain transverse vibration (arrow 9) which has the effect of corrugating this belt so that creasts and troughs are formed with the particulate material tending to accumulate in the troughs for positive entrainment by the belt. Naturally, the spacing of these crests along the belt will depend upon the frequency of vibration as related to the forward speed of the belt.

While the magnetostrictive oscillator 36, etc. shown in FIG. 1 is intended to represent any type of mechanical means for imparting oscillation to the band 8 via roller 7a or an auxiliary means, it may be preferable in some instances to derive the oscillations from the driven roller 7a itself. In this case the roller 7b (FIG. 3) can be provided with a noncircular cross-section (e.g. or prismatic configuration) so that the rotation of this roller will impart one or more oscillations in the direction of arrow 30b with, inherently, a vertical component in the direction of the arrow 9b. It will be apparent that, owing to the illustrated polygonal configuration of roller 7b, the belt 8b will execute more than two full cycles of transverse vibration during passage along the inclined front portion, seen in FIG. 3, of its upper reach.

The invention as described and illustrated is believed to admit of many modifications within the ability of persons skilled in the art, all such modifications being deemed encompossed within the spirit and scope of the appended claims.

I claim:

1. In an apparatus for projecting loose solid material, in combination, at least two substantially horizontally spaced supporting rollers including a forward roller and a rearward roller; an endless flexible conveyor belt passing around said rollers and forming an upper reach with an upwardly and forwardly inclined front portion terminating at said forward roller for projecting said material at high velocity from said belt; supply means for depositing said material upon said upper reach of said belt at a location intermediate said rollers; drive means for rotating one of said rollers to displace said belt at high velocity with said upper reach traveling from said supply means in the direction of said forward roller; and oscillating means for transversely vibrating said front portion of said belt in a vertical plane concurrently with the operation of said drive means.

2. In an apparatus for projecting loose solid material, in combination, at least two substantially horizontally spaced supporting rollers including a forward roller and a rearward roller; an endless flexible conveyor belt passing around said rollers and forming an upper reach with an upwardly and fowardly inclined front portion terminating at said forward roller for projecting said material at high velocity from said belt; supply means for depositing said material upon said upper reach of said belt at a location intermediate said rollers; driven means for rotating one of said rollers to displace said belt at high velocity with said upper reach traveling from said supply means in the direction of said forward roller; and oscillating means for transversely vibrating said front portion of said belt in a vertical plane concurrently with the operation of said drive means and at a rate so related to the speed of said drive means that the transit time of said belt along said upper portion coincides with at least one vibratory cycle.

3. In an apparatus for projecting loose solid material, in combination, at least two substantially horizontally spaced supporting rollers including a forward roller and a rearward roller; an endless flexible conveyor belt passing around said rollers and forming an upper reach with an upwardly and forwardly inclined front portion terminating at said forward roller for projecting said material at high velocity from said belt; supply means for depositing said material upon said upper reach of said belt at a location intermediate said rollers; drive means for rotating said forward roller to displace said belt at high velocity with said upper reach traveling from said supply means in the direction of said forward roller; and oscillating means including said forward roller for transversely vibrating said front portion of said belt in a vertical plane concurrently with the operation of said drive means.

4. In an apparatus for projecting loose solid material, in combination, at least two substantially horizontally spaced supporting rollers including a forward roller and a rearward roller; an endless flexible conveyor belt passing around said rollers and forming an upper reach with an upwardly and forwardly inclined front portion terminating at said forward roller for projecting said material at high velocity from said belt; supply means for depositing said material upon said upper reach of said belt at a location intermediate said roller; drive means for rotating said forward roller to displace said belt at high velocity with said upper reach traveling from said supply means in the direction of said forward roller; and oscillating means including said forward roller for transversely vibrating said front portion of said belt in a vertical plane concurrently with the operation of said drive means and at a rate so related to the speed of said drive means that the transit time of said belt along said upper portion concides with at least one vibratory cycle.

5. The combination defined in claim 4 wherein said forward roller has a polygonal outline.

References Cited by the Examiner

UNITED STATES PATENTS

| 2,681,137 | 6/54 | Davis | 198—230 |
| 2,781,892 | 2/57 | Theuenieau | 198—128 |
| 2,869,716 | 1/59 | Vidmar | 198—230 |

SAMUEL F. COLEMAN, *Primary Examiner.*

WILLIAM B. LA BORDE, ERNEST A. FALLER,
*Examiners.*